United States Patent
Kaleeswaran et al.

(10) Patent No.: US 8,429,919 B2
(45) Date of Patent: Apr. 30, 2013

(54) EXPANSION HULA SEALS

(75) Inventors: Karthick Kaleeswaran, Bangalore Karnataka (IN); Ganesh Pejawar Rao, Bangalore Karnataka (IN)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 12/473,312

(22) Filed: May 28, 2009

(65) Prior Publication Data

US 2010/0300116 A1 Dec. 2, 2010

(51) Int. Cl.
 *F02C 7/20* (2006.01)
 *F02C 1/00* (2006.01)
 *F02G 3/00* (2006.01)
 *F16J 15/02* (2006.01)

(52) U.S. Cl.
 USPC ............ 60/800; 60/798; 60/752; 277/644; 277/647

(58) Field of Classification Search .......... 60/39.37, 60/752–760, 796, 798, 800; 277/644, 647, 277/650, 652, 653
See application file for complete search history.

(56) References Cited

U.S. PATENT DOCUMENTS

| | | | |
|---|---|---|---|
| 3,759,038 A | 9/1973 | Scalzo et al. | |
| 5,987,879 A * | 11/1999 | Ono | 60/800 |
| 6,334,310 B1 | 1/2002 | Sutcu et al. | |
| 6,644,667 B2 * | 11/2003 | Grondahl | 277/355 |
| 7,082,770 B2 * | 8/2006 | Martling et al. | 60/796 |
| 2006/0255549 A1 * | 11/2006 | Amos et al. | 277/644 |
| 2008/0016876 A1 | 1/2008 | Colibaba-Evulet et al. | |
| 2008/0034759 A1 | 2/2008 | Bulman et al. | |
| 2008/0155987 A1 | 7/2008 | Amond et al. | |

\* cited by examiner

*Primary Examiner* — Phutthiwat Wongwian
*Assistant Examiner* — Carlos A Rivera
(74) *Attorney, Agent, or Firm* — Sutherland Asbill & Brennan LLP

(57) ABSTRACT

The present invention provides a hula seal for use with a combustor. The hula seal includes a number of legs that define a number of slots. The slots may include a number of expansion slots.

16 Claims, 3 Drawing Sheets

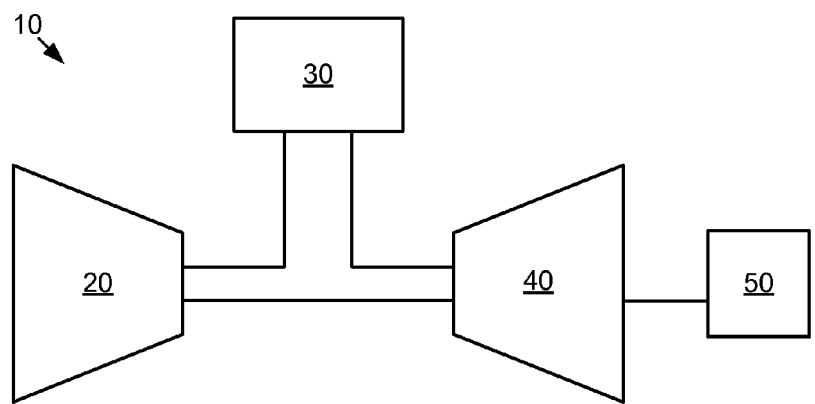
Fig. 1 (Prior Art)
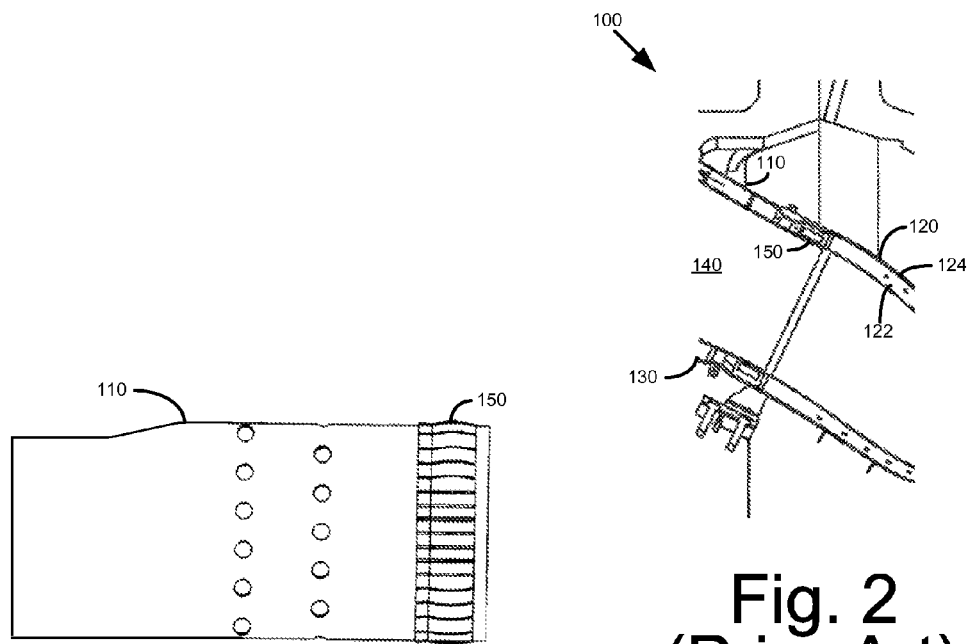
Fig. 3
(Prior Art)
Fig. 2
(Prior Art)

EXPANSION HULA SEALS

TECHNICAL FIELD

The present application relates generally to gas turbine engines and more particularly relates to the use of expansion hula seals as an interface, for example, between a combustion liner and a transition piece.

BACKGROUND OF THE INVENTION

Known combustors may use a hula seal as an interface between the combustion liner and the transition piece. Similar types of hula seals may be used between a combustion liner cap assembly and the combustion liner and/or elsewhere with the gas turbine engine. As described in, for example, commonly owned U.S. Pat. No. 6,334,310, a hula seal is generally defined as a system of leaf springs formed into a round loop and used to seal a sliding interface joint or annular gap between two concentric ducts.

A certain amount of mass flow is generally leaked through the hula seal in order to maintain low temperatures about the seals. A hula seal with a larger leakage area may be used to divert more airflow directly to the hot side of the liner so as to reduce the air mass flow going to the headend. This flow also may help increase the lean burnout margin.

There is thus a desire for an improved hula seal design that may increase the flow therethrough. Such an increased flow should also decrease the pressure drop so as to reduce the thermal radiance about the transition piece headend. Such an increased flow also should increase overall combustor efficiency as well as system efficiency as a whole.

SUMMARY OF THE INVENTION

The present invention thus provides a hula seal for use with a combustor. The hula seal includes a number of legs that define a number of slots. The slots may include a number of expansion slots.

The present application further provides a method of operating a combustor. The method may include the steps of defining a number of expansion slots in a hula seal, positioning the hula seal about a combustor liner and a transition piece, and circumferentially spreading a leakage flow from the combustion liner through the expansion slots of the hula seal.

The present application further provides for a combustor. The combustor may include a liner, a transition piece, and a hula seal positioned about the liner and the transition piece. The hula seal may include a number of expansion slots.

These and other features of the present application will become apparent to one of ordinary skill in the art upon review of the following detailed description when taken in conjunction with the several drawings and the appended claims.

BRIEF DESCRIPTION OF THE DRAWINGS

FIG. 1 is a schematic view of a gas turbine engine.
FIG. 2 is a side cross-sectional view of a liner and a transition piece of a combustor.
FIG. 3 is a side plan view of a combustor liner.

DETAILED DESCRIPTION

Figure 4:
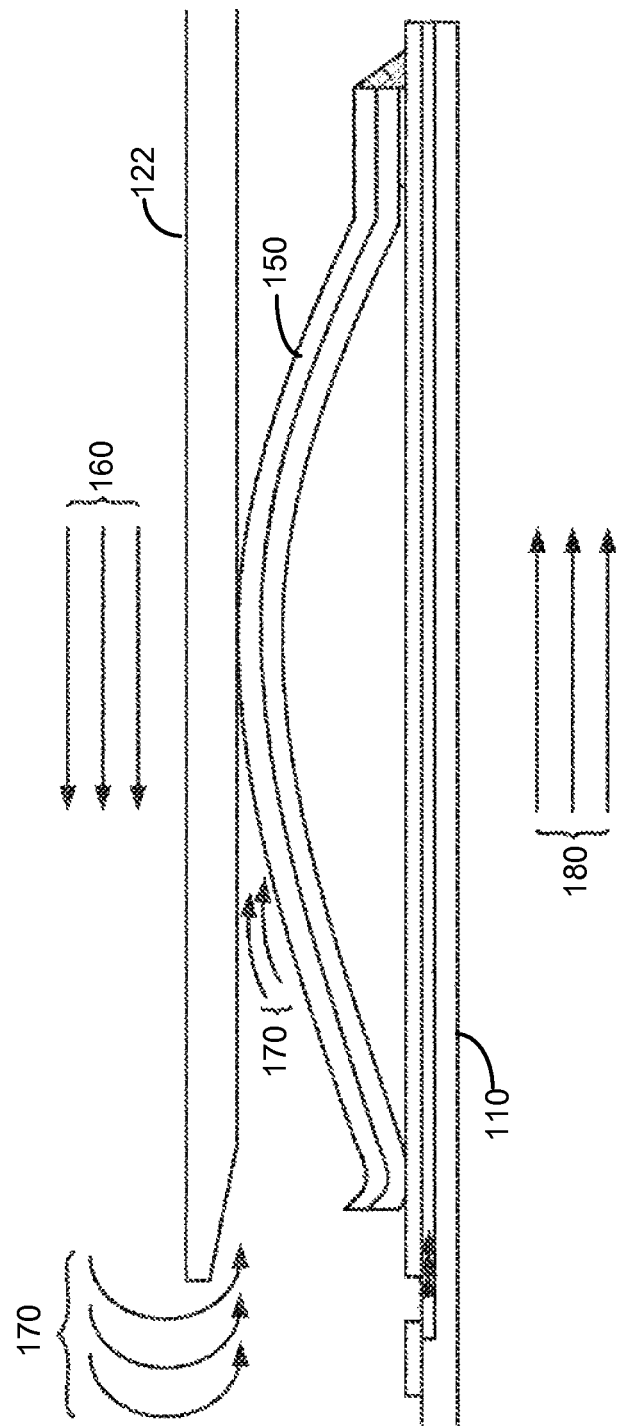
FIG. 4 is a side view of a known hula seal.

Referring now to the drawings, in which like numbers refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. (Although only a single combustor 30 is shown, the gas turbine engine 10 may include any number of combustors 30). The hot combustion gases are in turn delivered to a turbine 40. The hot combustion gases drive the turbine 40 so as to produce mechanical work. The mechanical work produced in the turbine 40 drives the compressor and an external load 50 such as an electrical generator and the like. The gas turbine engine 10 may use natural gas, various types of syngas, and other types of fuels.

The gas turbine engine 10 may be a 9FA Turbine or a similar device provided by General Electric Company of Schenectady, New York. Other types of gas turbine engines may be used herein. The gas turbine engine 10 may have other configurations and may use other types of components. Multiple gas turbine engines 10, other types of turbines, and other types of power generation equipment may be used herein together.

FIG. 2 shows a partial cross-sectional view of a combustor 100. As is known, the combustor 100 includes a combustor liner 110 and a transition piece 120. The transition piece 120 includes an inner wall 122 and an outer wall 124. The liner 110 includes a flow sleeve 130 and a combustion zone 140. The liner 110 and the transition piece 120 may be joined by a hula seal 150. The combustion liner 110 with the hula seal 150 thereon is shown in FIG. 3.

As described above, the hula seal 150 generally is a system of leaf springs formed into a round loop. The hula seal 150 may be made out of Inconel X750 (a Nickel-Chromium alloy made precipitation hardenable by additions of Aluminum and Titanium, having creep-rupture strength at high temperatures to about 700° C. (1290° F.)) or similar types of materials. FIG. 4 shows the interface between the combustor liner 110 and the inner wall 122 of the transition piece 120. A portion of a compressor airflow 160 tends to follow a leakage path indicated by a number of leakage flow arrows 170. The leakage flow 170 generally results from a differential pressure during operation of the combustor 100 between the compressor airflow 160 and a hot gas flow 180 inside the liner 110. The compressor airflow 160 may be at a relatively higher static pressure and lower temperature than the hot gas flow 180.

Figure 5:
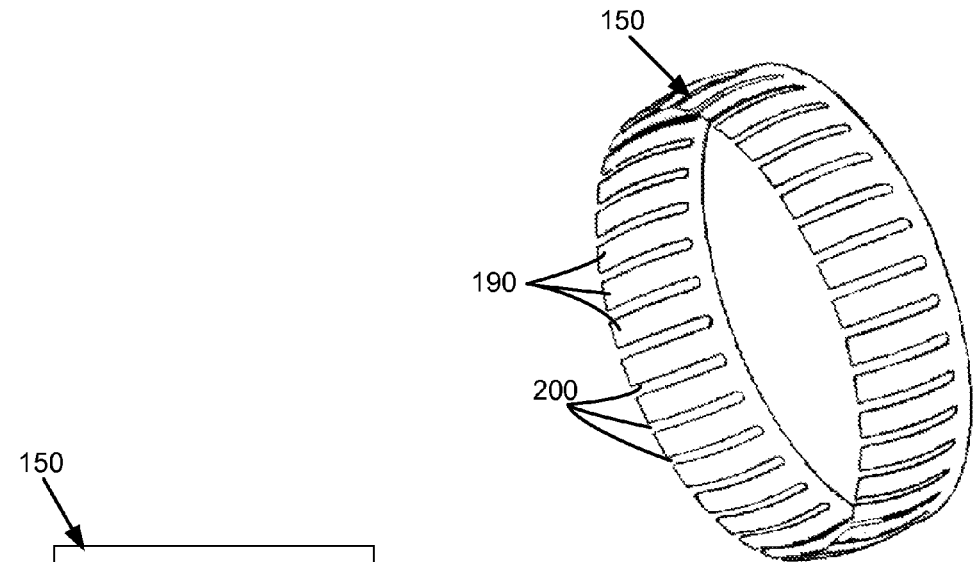
FIG. 5 is a perspective view of a known hula seal.
Figure 6:
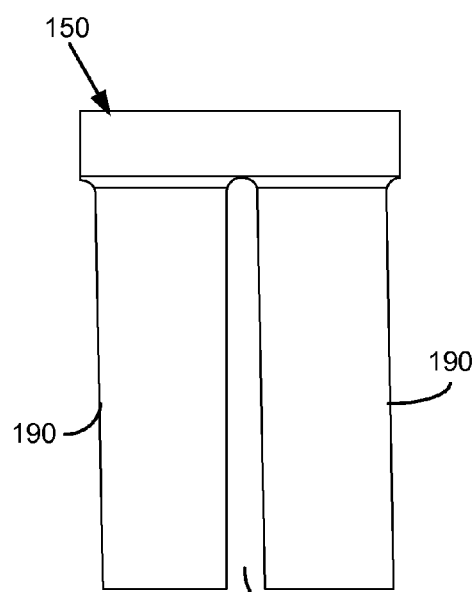
FIG. 6 is a plan view of a hula seal with a slot.

FIGS. 5 and 6 show the hula seal 150. As is shown, the hula seal 150 includes a number of legs 190 that define the number of slots 200. The slots 200 are generally uniform in size and shape. The leakage flow 170 may pass through the slots 200.

Figure 7:
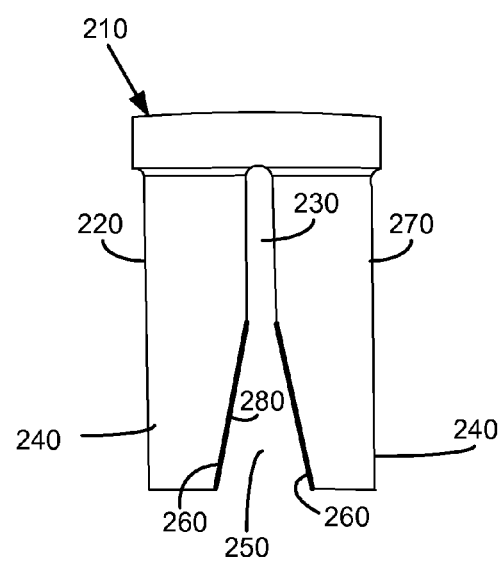
FIG. 7 is a plan view of an expanded hula seal with an expanded slot as is described herein.

FIG. 7 shows a hula seal 210 as is described herein. As is shown, the hula seal 210 also includes a number of legs 220 that define a number of slots 230. In this example, however, an aft end 240 of the legs 220 includes an expansion slot 250. As is shown, the legs 220 include a cutout 260 such that the expansion slot 250 is wider than the slot 230 that begins at a forward end 270. Although the cutout 260 may take any desired shape, a diagonal shape 280 is shown. The cutout 260 may take all or part of the legs 220.

The hula seal 210 with the expansion slots 250 thus would circumferentially spread out the leakage flow 170. The flow 170 also would decrease the pressure drop and reduce the thermal radiance about the headend of the transition piece 120. The expansion slots 250 leak more airflow into the hot gas flow so as to reduce the total air mass flow. This flow should prevent flame lean burnout, reduce the pressure drop across the hula seal 210, and improve the overall durability of the transition piece 120. The cutouts 260 likewise optimize the exit expansion angle and area of the hula seals 210.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:
1. A hula seal for use with a combustor, comprising:
a ring extending circumferentially about an axis; and
a plurality of legs extending axially from the ring, each of the plurality of legs comprising:
a free end opposite the ring; and
a bowed portion extending radially outward from the ring;
the plurality of legs defining a plurality of slots, each of the plurality of slots comprising a diverging portion extending toward the free ends of adjacent legs to increase an airflow flowing through the hula seal and into the combustor.

2. The hula seal of claim 1, wherein each of the plurality of legs comprises a cutout therein so as to define the diverging portion of each of the plurality of slots.

3. The hula seal of claim 2, wherein the cutout is positioned adjacent the free end of each of the plurality of legs.

4. The hula seal of claim 2, wherein the cutoun comprises a diagonal shape.

5. The hula seal of claim 1, wherein a width of each of the plurality of slots is greater at an open end positioned between the free ends of adjacent legs as compared to a closed end positioned adjacent the ring.

6. The hula seal of claim 1, further comprising a Nickel-Chromium alloy.

7. The hula seal of claim 1, wherein the plurality of slots define a plurality of leakage flow paths therethrough.

8. A method of operating a combustor, comprising:
providing a hula seal positioned within an annular space between a combustor liner and a transition piece, wherein the hula seal comprises:
a ring extending circumferentially about an axis; and
a plurality of legs extending axially from the ring, each of the plurality of legs comprising:
a free end opposite the ring; and
a bowed portion extending radially outward from the ring;
the plurality of legs defining a plurality of slots, each of the plurality of slots comprising a diverging portion extending toward the free ends of adjacent legs;
wherein the ring and the free ends of the plurality of legs contact the combustor liner; and wherein the bowed portions of the plurality of legs contact the transition piece; and
delivering a flow of compressor air through the hula seal; and
delivering a flow of hot gas through the combustor liner.

9. The method of claim 6, further comprising reducing the pressure drop across the hula seal.

10. A combustor, comprising:
a combustor liner;
a transition piece; and
a hula seal positioned within an annular space between the liner and the transition piece;
wherein the hula seal comprises:
a ring extending circumferentially about an axis; and
a plurality of legs extending axially from the ring, each of the plurality of legs comprising:
a free end opposite the ring; and
a bowed portion extending radially outward from the ring;
the plurality of legs defining a plurality of slots, each of the plurality of slots comprising a diverging portion extending toward the free ends of adjacent legs;
wherein the ring and the free ends of the plurality of legs contact the combustor liner; and wherein the bowed portions of the plurality of legs contact the transition piece.

11. The combustor of claim 10, wherein each of the plurality of legs comprises a cutout therein so as to define the diverging portion of each of the plurality of slots.

12. The combustor of claim 11, wherein the cutout is positioned adjacent the free end of each of the plurality of legs.

13. The combustor of claim 11, wherein the cutout comprises a diagonal shape.

14. The combustor of claim 10, wherein a width of each of the plurality of slots is greater at an open end positioned between the free ends of adjacent legs as compared to a closed end positioned adjacent the ring.

15. The combustor of claim 10, wherein the hula seal comprises a Nickel-Chromium alloy.

16. The combustor of claim 10, wherein the plurality of slots define a plurality of leakage flow paths therethrough.

* * * * *

UNITED STATES PATENT AND TRADEMARK OFFICE
CERTIFICATE OF CORRECTION

PATENT NO. : 8,429,919 B2
APPLICATION NO. : 12/473312
DATED : April 30, 2013
INVENTOR(S) : Karthick Kaleeswaran and Ganesh Pejawar Rao It is certified that error appears in the above-identified patent and that said Letters Patent is hereby corrected as shown below:

In the Claims in Column 3, line 34, after "wherein the", delete "cutoun" and insert -- cutout --

Signed and Sealed this
Eleventh Day of June, 2013

Teresa Stanek Rea
*Acting Director of the United States Patent and Trademark Office*